United States Patent
Hélot et al.

(10) Patent No.: US 10,867,588 B2
(45) Date of Patent: Dec. 15, 2020

(54) INSTRUMENT CLUSTER HAVING A DEFORMABLE DISPLAY

(71) Applicant: AUDI AG, Ingolstadt (DE)

(72) Inventors: Jacques Hélot, Ingolstadt (DE); Joris Mertens, Ingolstadt (DE); Immo Redeker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/479,428

(22) PCT Filed: Dec. 13, 2017

(86) PCT No.: PCT/EP2017/082716
§ 371 (c)(1),
(2) Date: Sep. 5, 2019

(87) PCT Pub. No.: WO2018/134004
PCT Pub. Date: Jul. 26, 2018

(65) Prior Publication Data
US 2019/0385574 A1    Dec. 19, 2019

(30) Foreign Application Priority Data
Jan. 20, 2017   (DE) .................. 10 2017 200 949

(51) Int. Cl.
*G09G 5/38* (2006.01)
*B60K 35/00* (2006.01)
*G06F 3/01* (2006.01)

(52) U.S. Cl.
CPC ............. *G09G 5/38* (2013.01); *B60K 35/00* (2013.01); *G06F 3/013* (2013.01);
(Continued)

(58) Field of Classification Search
CPC .... G06F 1/1601; G06F 1/1652; G06F 1/1641; G06F 3/013; F16M 11/22;
(Continued)

(56) References Cited

U.S. PATENT DOCUMENTS 9,069,379 B2* 6/2015 Suo ...................... G09G 3/2092
9,413,284 B2* 8/2016 Cho ......................... H02K 7/00
(Continued)

FOREIGN PATENT DOCUMENTS

CN    104163134 A    11/2014
DE    199 51 001 A1   5/2001
(Continued)

OTHER PUBLICATIONS

International Preliminary Report on Patentability dated Aug. 1, 2019 from International Patent Application No. PCT/EP2017/082716, 9 pages.
(Continued)

*Primary Examiner* — Christopher E Leiby
(74) *Attorney, Agent, or Firm* — Staas & Halsey LLP (57) ABSTRACT

Vehicle information is displayed on a deformable display of an instrument cluster for a motor vehicle. The instrument cluster includes the deformable display, a support structure, at least one sensor element, and at least one movement element. The deformable display is arranged on the support structure and the support structure is movable from a first position into a second position by using the at least one movement element, based on environmental influences detected by the sensor element.

20 Claims, 6 Drawing Sheets

(52) U.S. Cl.
CPC .... *B60K 2370/332* (2019.05); *B60K 2370/48* (2019.05); *B60K 2370/52* (2019.05); *B60K 2370/67* (2019.05); *B60K 2370/741* (2019.05); *G09G 2354/00* (2013.01)

(58) Field of Classification Search
CPC ........... G09G 2380/02; G09G 2354/00; G09G 2320/028; G09G 5/38; B60K 35/00; B60K 37/06; B60K 2370/67; B60K 2370/1523; B60K 2370/736; B60K 2370/39; B60K 2370/73; B60K 2370/52; B60K 2370/48; B60K 2370/741; B60K 2370/589; B60K 2370/1533; B60K 2370/332; B60R 11/0223; B60R 2011/0085; B60R 2011/0092; B60Y 2200/90; B60Y 2200/12
See application file for complete search history.

(56) References Cited

U.S. PATENT DOCUMENTS

| | | | | |
|---|---|---|---|---|
| 9,952,724 | B2* | 4/2018 | Akimoto | G09G 3/3648 |
| 2009/0128317 | A1* | 5/2009 | Hideshiro | B60K 35/00 |
| | | | | 340/459 |
| 2013/0114193 | A1 | 5/2013 | Joo et al. | |
| 2014/0292665 | A1* | 10/2014 | Lathrop | G06F 3/0416 |
| | | | | 345/173 |
| 2014/0354791 | A1* | 12/2014 | Lee | G06K 9/00228 |
| | | | | 348/77 |
| 2014/0380186 | A1 | 12/2014 | Kim et al. | |

FOREIGN PATENT DOCUMENTS

| | | |
|---|---|---|
| DE | 102 14 200 C1 | 11/2003 |
| DE | 10 2012 010 679 A1 | 12/2013 |
| DE | 10 2014 009 609 A1 | 12/2014 |
| DE | 10 2014 221 091 B3 | 3/2016 |
| DE | 10 2014 221 092 A1 | 4/2016 |
| DE | 10 2014 016 225 A1 | 5/2016 |
| DE | 10 2014 016 323 A1 | 5/2016 |
| DE | 10 2014 019 125 A1 | 6/2016 |
| DE | 10 2015 009 141 A1 | 1/2017 |
| DE | 10 2017 200 949.7 | 7/2018 |
| DE | 10 2017 200 949 B4 | 5/2019 |
| WO | PCT/EP2017/082716 | 12/2017 |

OTHER PUBLICATIONS

German Office Action dated Aug. 30, 2017 from German Patent Application No. 10 2017 200 949.7, and English language translation thereof, 12 pages total.

German Office Action Decision to Grant dated Jan. 18, 2019 from German Patent Application No. 10 2017 200 949.7, and English language translation thereof, 18 pages total.

German Office Action dated Aug. 30, 2017 from German Patent Application No. 10 2017 200 949.7, 8 pages.

German Office Action dated Jan. 18, 2019 from German Patent Application No. 10 2017 200 949.7, 10 pages.

International Search Report dated Feb. 19, 2018 from International Patent Application No. PCT/EP2017/082716, 3 pages.

* cited by examiner

INSTRUMENT CLUSTER HAVING A DEFORMABLE DISPLAY

CROSS REFERENCE TO RELATED APPLICATIONS

This application is a U.S. national stage of International Application No. PCT/EP2017/082716, filed on Dec. 13, 2017. The International Application claims the priority benefit of German Application No. 10 2017 200 949.7 filed on Jan. 20, 2017. Both the International Application and the German Application are incorporated by reference herein in their entirety.

BACKGROUND

Described herein is an instrument cluster having a deformable display. Furthermore, the disclosure relates to a vehicle which is equipped with a corresponding instrument cluster.

Vehicles for traveling on roads are equipped with a display which enables the driver to read current vehicle information or vehicle states. These include the current speed, the current rotational speed of the engine, the tank filling amount and further information. Such displays are also called instrument clusters since they permit a combined illustration of information. Furthermore, there are further display devices which are arranged, for example, between the driver and the front passenger in what is referred to as a center console. Other display devices are arranged, for example, in the backrest of a front seat in order to provide the respective passenger sitting behind this seat in the vehicle with an entertainment program.

Figure 10:
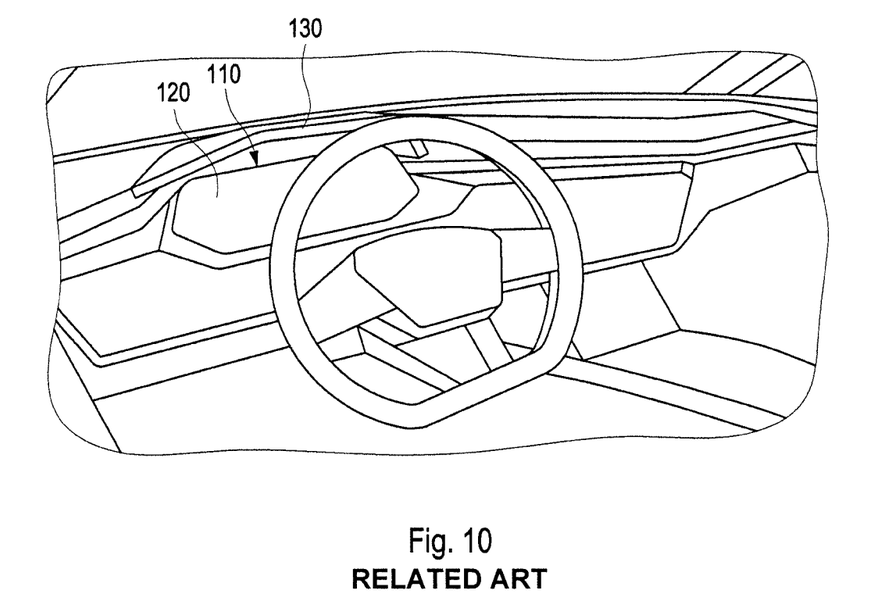
FIG. 10 is a vehicle interior from the related art.

It has hitherto been known—as shown in FIG. 10—to arrange the display devices 110 with a display 120 statically in the vehicle, i.e. the display devices 110 or the display 120 are not arranged pivotably or so as to be changeable in their shape. However, curved displays or displays which can be unfolded as a whole are known. So that, in the event of solar radiation, the displays 120 are nevertheless easily readable and the contents can be seen, a sun shading device 130 in the form of a cladding overhang or a shielding is customarily provided in the region around the display device 110. This can be seen particularly readily in FIG. 10 at the dashboard for the driver in front of the steering wheel. Alternatively, it is also known to react to the solar radiation by changing the brightness of the display.

German patent application publication 10 2014 009 609 A1 describes a display arrangement for a center console, in which the display conceals a compartment behind the display, wherein the display is foldable in order to open up the concealed compartment and to permit access thereto. The foldable display can be formed here with or without a hinge.

Chinese patent application publication 104 163 134 A describes a flexible transparent OLED (Organic Light Emitting Diode) display which is arranged on a windshield of a vehicle. The display and at least two further infrared cameras are connected to a control system in the vehicle. A carrier material of the flexible display and a housing are produced from a flexible material. The display displays information from the surroundings outside the vehicle, the information having been recorded by the at least two infrared cameras.

German patent application publication 10 2014 019 125 A1, which originates from the same applicant as the subject disclosure, describes an interior device having a touch-sensitive screen for controlling a controllable device, wherein the inclination, the curvature and/or the position of the screen are adjustable relative to the interior device, wherein a control device of the motor vehicle is designed to control the inclination, curvature and/or position of the screen depending on an inclination of a backrest and/or position of the seat in the forward direction.

Disadvantages of the related art include the fact that the display is in each case adjustable in its position exclusively as a whole, i.e. can be pivoted or can be rotated in order, for example, to increase the comfort. In particular, a pivotable display is provided only for entertainment displays, such as in the center console or in the backrest of the front seat. Furthermore, previous displays have only been configured to react flexibly to situations via the contents of the display.

SUMMARY

It is therefore an aspect of the disclosure to address at least some of the discussed disadvantages and problems. In particular, a solution is intended to be provided which permits a display device to be able to be easily read in every situation. The intention is at least to propose at least one alternative to the known solution.

According to the disclosure, an instrument cluster for displaying vehicle information is therefore proposed, having a deformable display, a support structure, at least one sensor element, and at least one movement element, wherein the deformable display is arranged on the support structure, and the support structure is movable from a first position into a second position by using the at least one movement element depending on environmental influences detected by the sensor element.

The deformable display is therefore arranged on a structure which is adjustable per se. The movement elements control the support structure and permit the support structure to be movable into any desired position. The movement elements can include actuators which act on the support structure. Since the display itself is deformable and is arranged on the support structure, it follows the movement of the support structure in the respective designated direction. The sensor element is configured in order, for example, to measure and to process the light intensity falling on the display. The values recorded by the sensor element are transmitted to a control device. The movement elements are controlled via a control device.

A driver can thereby also individually adapt the display for displaying vehicle information and vehicle states to his/her needs. If the control device recognizes that the light is very intense, the support structure, for example, is adjusted in such a manner that a shadow cast by the display itself falls onto the rest of the display. This decreases the intensity of the light on the display, and the display can be better read, and separate shielding for the display in the vehicle can be dispensed with. The instrument unit can therefore be designed to be lighter. The interior space provides an increased sensation of space and has a visually modern effect. However, the instrument cluster is also configured to automatically adapt itself to surrounding conditions.

An advantageous development of the instrument cluster is characterized in that the support structure includes a plurality of individual support elements which are movable independently of one another. As a result, the setting of the display for the driver can be further individualized according to the driver's own needs. For example, in the event of solar radiation from a certain direction, one support element can be adjusted specifically in such a manner that a shadow is cast on the display to be read, and therefore the display can continue to be easily read. However, the individual adjustment of the instrument cluster can also take place automatically as a result of the identified and evaluated sensor value in order to ensure the readability of the display.

Another advantageous refinement of the instrument cluster is characterized in that the support structure is movable from the first position into the second position depending on a vehicle setting. For example, the position of the display changes depending on the driving mode, that is, when a sports mode is selected, only the most necessary information is visible for the driver by the display being adjusted in such a manner that some of the information is concealed, whereas, in another driving mode, all of the information is visible for the driver by the display being able to be completely seen by the driver.

A further advantageous development of the instrument cluster is characterized in that the deformable display is rotatable at least in sections about a first axis and/or about at least one second axis and is thereby deformable. The display is therefore not only deformable in one direction. Accordingly, the individual support elements are also movable individually about the first and/or second axis since they move the deformable display.

Yet another advantageous development of the instrument cluster is characterized in that the at least one second axis is arranged substantially parallel to the first axis. As a result, the display can be divided into at least three portions, and therefore the portions can be rotated independently of one another about the respective axes. The individual portions of the display can therefore be set individually with respect to one another in order, for example, to mutually protect one another against a severe incidence of light, in order to ensure good readability of the individual portions.

Another advantageous refinement of the instrument cluster makes provision for the second axis to be arranged substantially transversely with respect to the first axis. As a result, the display can be adjusted in different directions. One portion can therefore be adjusted laterally whereas another portion can be adjusted upward or downward.

A further advantageous development of the instrument cluster is characterized in that, in the first position, the deformable display is designed to be substantially planar. The entire display is therefore visible in this position. The display takes up such a position, for example, if there is little incidence of light or in a corresponding driving mode.

Yet another advantageous refinement of the instrument cluster makes provision, in an intermediate position between the first and the second position and/or in the first position and/or in the second position, for at least one support element to be at an angle different from zero degrees (0°) with respect to the respective other support elements. The angle is measured here with respect to the plane in which the support elements or the deformable display are present in substantially planar form. The support elements are therefore at angle unequal to 180° or 360° with respect to one another when they are arranged in the second position. As a result, portions of the display are also at an angle unequal to 180° or 360° with respect to one another. Therefore, the display can be adjusted in such a manner that, in the event of a severe incidence of light, the display itself provides shielding against the incidence of light.

The instrument cluster is advantageously developed in that the instrument cluster is configured to display the displays of vehicle information at a constant angle for a vehicle driver depending on the position of the support structure. If, for example, the support structure is inclined, in order to protect the display from solar radiation, the driver can continue to read the display as though the support structure were not inclined. For this purpose, the instrument cluster is configured in order to distort the depiction of the information on the display in such a manner that if the driver is looking at the inclined display at an angle, i.e. not from the front and not vertically, the driver perceives the depictions on the display in undistorted form as though the support structure were not inclined.

A further advantageous development of the instrument cluster is characterized in that the instrument cluster is configured to follow an eye point of the driver and to adapt the depiction of the information on the deformable display to a position of the eye point. If, for example, the driver changes the inclination of the seat or another larger or smaller driver sits on the seat, i.e. the driver looks at the display from a different angle, the depiction of the information on the display changes in such a manner that the driver perceives it consistently.

Another advantageous refinement of the instrument cluster makes provision for the deformable display to be an OLED display. Such a display is suitable particularly for deformable displays.

The instrument cluster is developed in that the movement element includes a lever arrangement for moving the support elements. The support elements can be moved in a simple manner by using the lever arrangement. Such a design with levers is particularly cost-effective and low in maintenance.

Another advantageous development of the instrument cluster is characterized in that the support elements are arranged one above another in layers which are displaceable with respect to one another. A particularly space-saving arrangement of the instrument cluster is thereby made possible.

Furthermore, a vehicle is disclosed with a vehicle interior which includes at least one instrument cluster according to one or more of the above-described embodiments.

One refinement is characterized in that an instrument panel includes at least one instrument cluster according to one or more of the above-described embodiments.

Another refinement makes provision for the instrument panel to be free from a shielding device for shielding the deformable display from sunlight. As a result, the instrument unit and therefore the vehicle as a whole can be designed to be lighter.

Further advantages and refinements will emerge from the description and the attached drawings. Aspects of the disclosure are illustrated schematically in the drawings with reference to example embodiments and are described schematically and in detail with reference to the accompanying drawings, wherein identical elements in the drawings are provided with the same reference signs.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Reference will now be made in detail to examples which are illustrated in the accompanying drawings, wherein like reference numerals refer to like elements throughout.

Figure 1:
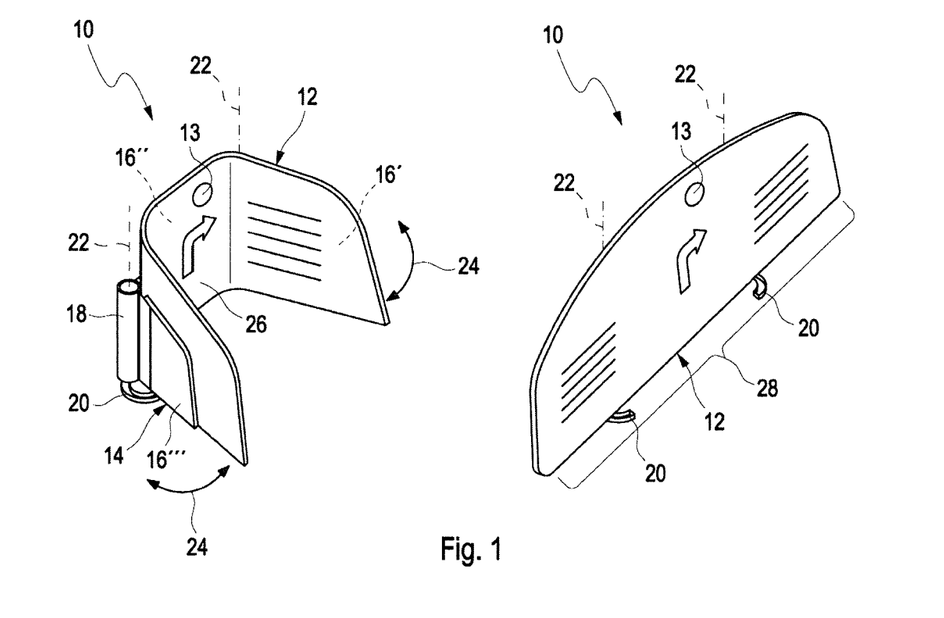
FIG. 1 includes perspective views of an embodiment of an instrument cluster according to the disclosure, FIG. 2 includes top sectional views of the embodiment of the instrument cluster of FIG. 1, FIG. 3 includes perspective views of a further embodiment of an instrument cluster according to the disclosure, FIG. 4 includes side sectional views of the embodiment of the instrument cluster of FIG. 3, FIG. 5 includes side sectional views of a further embodiment of an instrument cluster according to the disclosure, FIG. 6 includes perspective views of a further embodiment of an instrument cluster according to the disclosure.

FIG. 1 shows an instrument cluster 10 in a first position on the left side and the instrument cluster 10 in a second position on the right side. The instrument cluster 10 has a deformable display 12. The deformable display 12 is arranged on a support structure 14. In this embodiment, the support structure 14 has three support elements 16', 16", 16'''. The deformable display 12 is an OLED display. Alternatively, an active matrix OLED display (AMOLED) could also be used.

The support element 16', 16", 16''' are movable by using movement elements 18. The movement elements 18 move the support element 16', 16", 16''' along rails 20. The rails 20 are configured to guide the support elements 16', 16", 16''' on the respective path. During the movement of the support elements 16', 16", 16''' along the rails 20, the support elements 16', 16", 16''' change their position about respective axes of rotation 22, as indicated by the arrows 24. The axes of rotation 22 are aligned substantially parallel to one another.

A sensor element 13 is arranged integrated in the display 12. The sensor element 13 is configured in order to measure and to evaluate an intensity of light falling on the display 12. In accordance with the evaluated intensity of the light, the display 12 can be deformed via the respective support elements 16', 16", 16''' in such a manner that individual portions of the display 12 cast a shadow on another portion of the display 12. As a result, contents 26 displayed on the deformable display 12 remain easily readable. The movement elements 18 for controlling the support elements 16', 16", 16''' can therefore be controlled depending on an incident intensity of light or other environmental influences. For this purpose, in accordance with the evaluated intensity of the light, a signal is transmitted to a control device, not shown, which then activates the movement elements 18.

The sensor element 13 can alternatively also be arranged in a region around the deformable display 12 in order to measure the intensity of the light in the region of the deformable display 12. If the sensor element is arranged in a region around the deformable display 12, a shadow is not cast on the sensor element 13 by the deformed display. As a result, the sensor element 13 can measure the intensity of the light in the region of the deformable display 12 without being influenced by the shadow, i.e. also without being influenced by the position of the deformable display 12.

In the first position of the instrument cluster 10, which position is shown on the left side of FIG. 1, content 26, for example basic information which is displayed on a central portion of the display 12 can be perceived by the driver. The central portion is arranged on the support element 16". The respectively other two portions which are connected to the respective support elements 16' and 16''' are folded inward, as a result of which the curvature of the display 12 has changed. The deformable display 12 is thereby arranged in a curved manner. The information displayed on these portions of the deformable display 12 are hidden to the driver. The instrument cluster 10 will take up such a position, for example, while a sports driving mode is selected. The inwardly folded portions of the deformable display 12 also protect that portion of the display 12 which displays the basic information 26 from solar radiation, for example in the event of sunlight laterally, and therefore increase the readability of the display 12.

In the second position of the instrument cluster 10 that is shown on the right side of FIG. 1, the support elements 16', 16", 16''' have been moved outward along the rails 20 by the movement elements 18. The deformable display 12 is now designed to be substantially planar. All of the information 28 on the deformable display 12 can now be perceived by the driver. The instrument cluster 10 or the display 12 will take up this position, for example, in the event of a low incidence of light.

Figure 2:
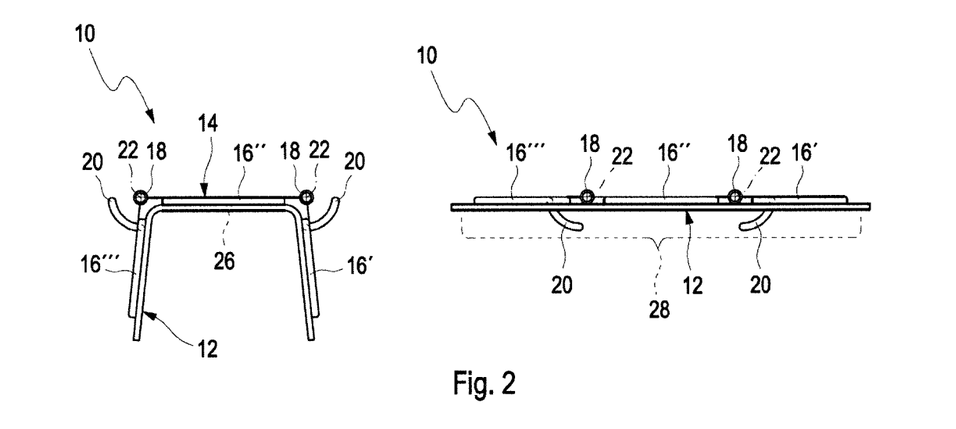

It is seen in the top view of FIG. 2 that the deformable display 12 is connected to the three support elements 16', 16", 16'''. The respective support elements 16', 16", 16''' are at a distance from one another, as a result of which, in the embodiment shown, the deformable display 12 is divided into three portions. The regions of the deformable display 12 that are not connected to the support elements 16', 16", 16''' are deformable and permit the movement of the deformable display 12 when the support elements 16', 16", 16''' are moved along the rails 20. In particular, these regions of the deformable display 12 change their curvature when the support elements 16', 16", 16''' are moved.

The position of the support elements 16', 16", 16''' can be changed depending on the measured intensity of the light or on a respective driving mode selectable by the driver. In the left position, in the event of a high intensity of light incidence, those portions of the display 12 which belong to the support elements 16''' and 16' shield that portion of the display 12 which belongs to the support element 16" from the high incidence of light, and therefore the content in the portion is readily readable. Alternatively, the position on the left side can also be taken up in a sports driving mode. In this case, only essential information is displayed on the shielded portion.

The position shown on the right is taken up when the measured intensity of the light is low. Alternatively, this position can also be taken up in a normal driving mode, and therefore more content is visible, for example additional navigation content 28, as can be seen on the right side in FIG. 1.

Figure 3:
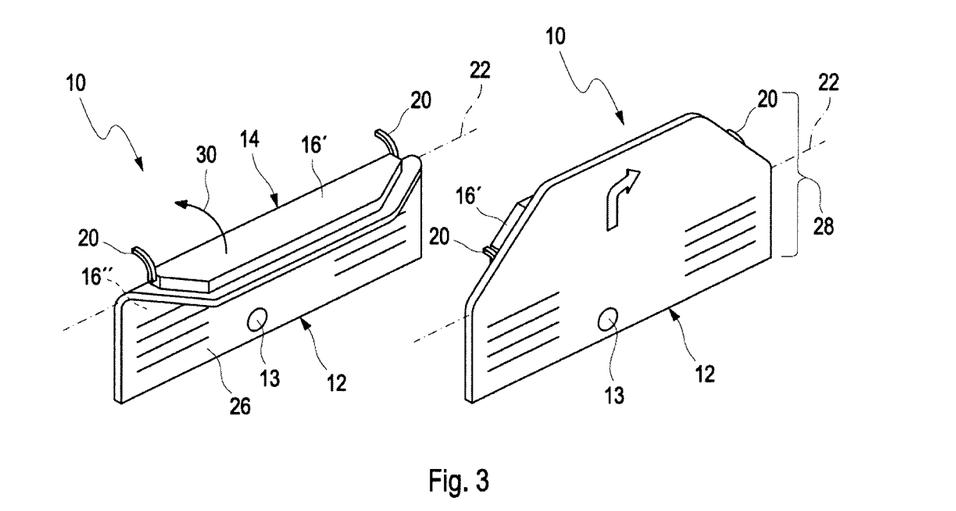

FIG. 3 shows an embodiment of the instrument cluster 10, in which the axis of rotation 22 is arranged in such a manner that at least one portion, here the upper portion of the deformable display 12, pivots upward or downward, as indicated by the arrow 30. In this embodiment, the sensor element 13 is arranged on a lower portion of the display 12. The upper portion of the instrument cluster 10 is moved along the rails 20 which are now likewise arranged in a manner corresponding to the other arrangement of the axis of rotation 22. The basic information 26 is now displayed on the lower portion of the deformable display 12. The instrument cluster will take up this position, for example, in the event of a strong incidence of light.

In the second position which is illustrated on the right side in FIG. 3, the deformable display 12 is again designed to be substantially planar. As a result, all the information 28 which can be displayed can be perceived. The instrument cluster will take up this position, for example, in the event of little incidence of light.

Figure 4:
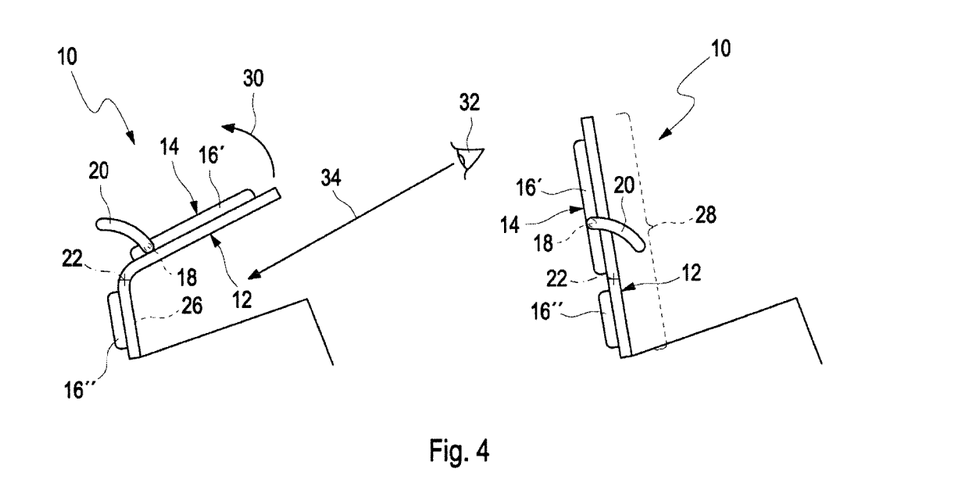

FIG. 4 shows a side sectional view of the embodiment of the instrument cluster 10 of FIG. 3. The deformable display 12 is connected in two portions to respective support elements 16' and 16". In the portion which is not connected to support elements 16', 16", the curvature of the deformable display 12 changes when the support element 16' is moved along the rails 20 and is pivoted along the arrow 30.

That portion of the deformable display 12 which is at the top in FIG. 4 is aligned in such a manner that the driver 32 can perceive the display 12 in the lower portion along the visual beam 34.

On the right side of FIG. 4, the instrument cluster 10 is again illustrated in the second position in which the deformable display 12 is arranged in a substantially planar manner. This light-dependent adjustability enables the instrument cluster 10 to be formed without a protective covering, what is referred to as a hood.

Figure 5:
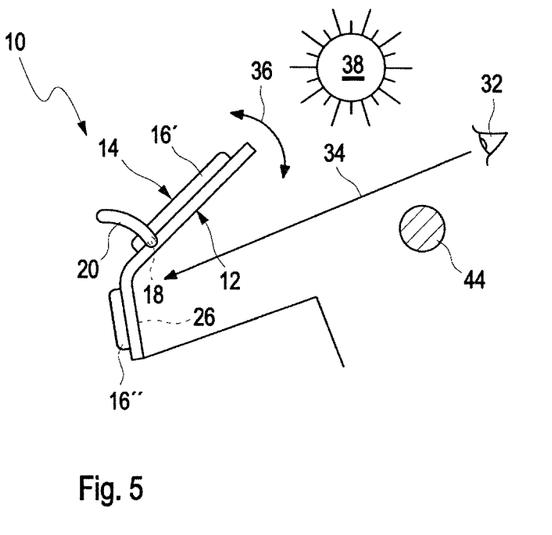

FIG. 5 shows a further side view of the instrument cluster 10. FIG. 5 shows that the position of the deformable portions of the deformable display 12 can be dependent on the incidence of light. For this purpose, the instrument cluster 10 pivots along the arrow 36. In the position on the left side of FIG. 5, the instrument cluster 10 as a whole is arranged somewhat more steeply than in the position on the right side. The instrument cluster 10 will take up the position on the left side if little light is incident or if the sun 38 takes up a corresponding position relative to the deformable display 12. The instrument cluster will take up the position on the right side of FIG. 5 if a large amount of light falls on the deformable display 12, in order to ensure correspondingly good readability. In each case, the instrument cluster 10 is arranged in such a manner that the driver 32 can see the deformable display 12, at least partially via the visual beam 34.

FIG. 5 furthermore shows two possibilities for carrying out the movement of the instrument cluster 10. The movement elements 18 include a lever arrangement 40 on the left side of FIG. 5. When the movement elements 18 are actuated, the lever arrangement 40 pivots along the arrow 42. As a result, the lever arrangement 40 acts on the upper support element 16' or the lower support element 16" and changes the respective position thereof.

On the right side of FIG. 5, the upper support element 16', as already described, is moved along the rails 20 by using movement elements 18, not shown in this drawing. As a result, the upper support element 16' pivots along the arrow 36. The instrument cluster 10 is arranged in front of a steering wheel 44 in the direction of travel.

Figure 6:
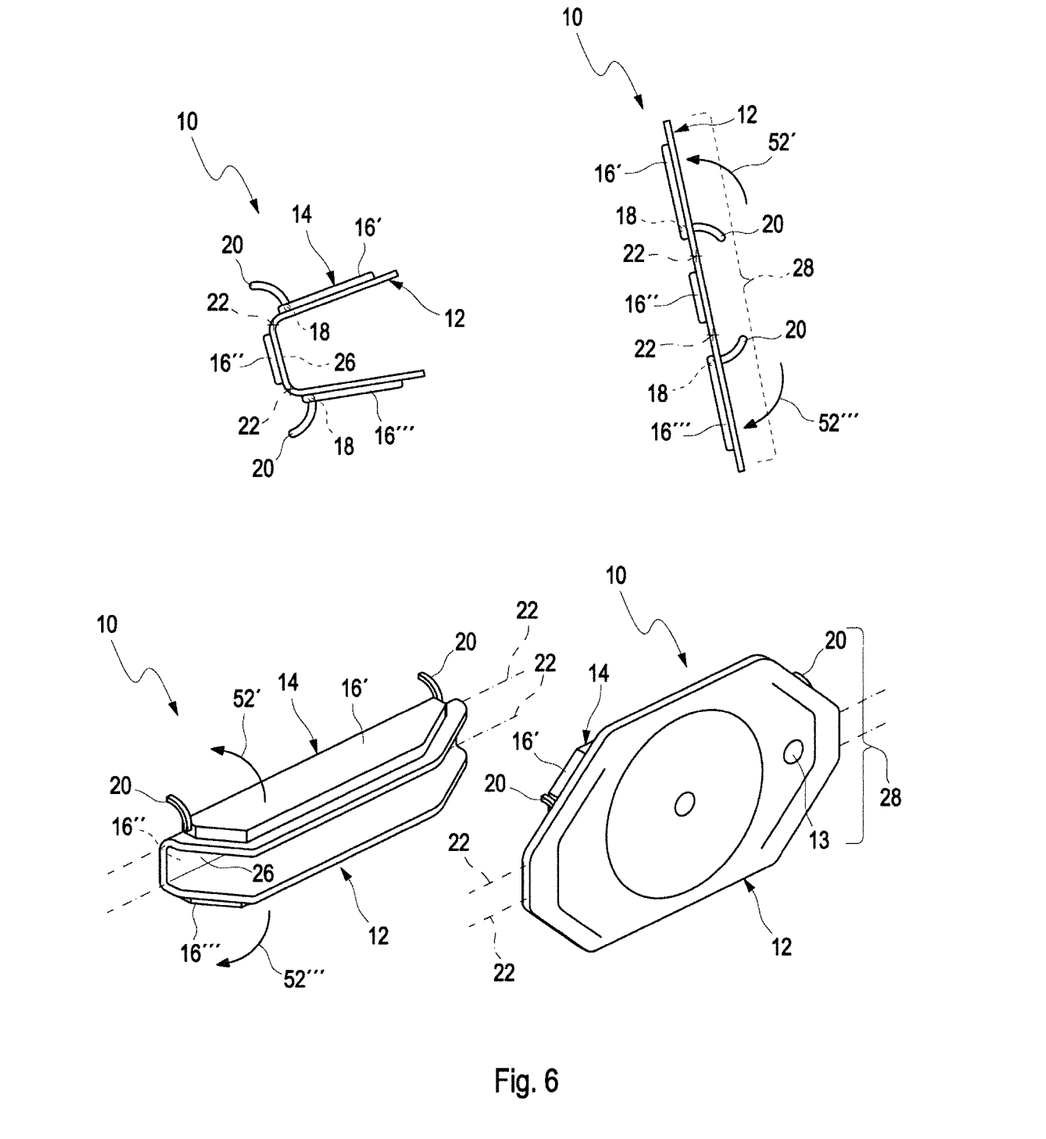

FIG. 6 shows further views of a further embodiment of the instrument cluster 10 with three portions which are deformable with respect to one another. The deformable display 12 is arranged on three support elements 16', 16", 16'". The upper support elements 16' and the lower support elements 16'" are pivotable here about a respective axis of rotation 22. As already described above, the support elements 16', 16'" are moved along the rails 20. The upper support element 16' pivots here along the arrow 52'. The lower support element 16'" pivots here along the arrow 52'". The axes of rotation are arranged parallel to each other here.

In the lower left view in FIG. 6, the instrument cluster 10 is shown in a perspective basic illustration. The upper support element 16' and the lower support element 16'" are each folded in here. In this arrangement of the instrument cluster 10, a driver perceives the basic information 26 (FIG. 1) on the central portion.

In the lower right view of FIG. 6, the displayed contents 28 are fully depicted. The upper support element 16' and the lower support element 16'" are unfolded along the arrows 52' and 52'", respectively. In this arrangement, the driver perceives the depicted information 28 in its entirety. The sensor element 13 is arranged in the central portion in order to measure the incidence of light.

Figure 7:
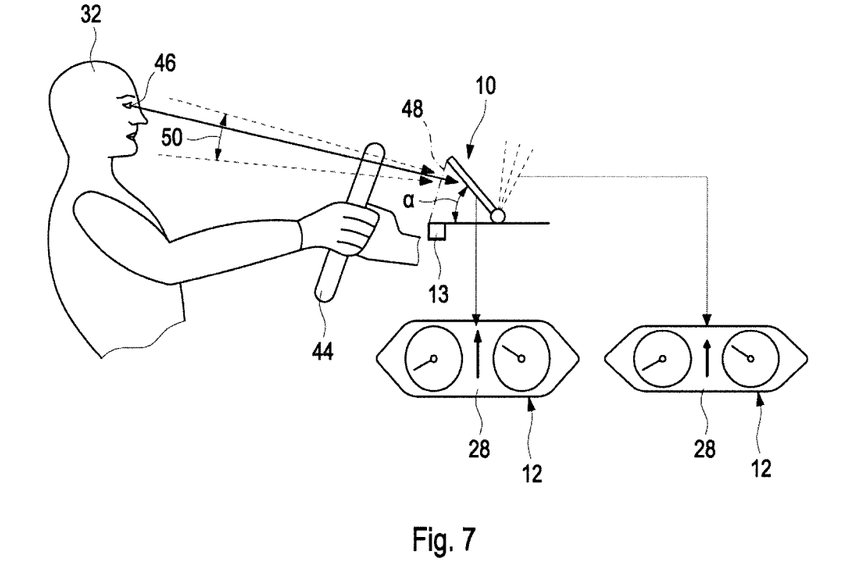
FIG. 7 is a side view of a vehicle interior with a further embodiment of an instrument cluster according to the disclosure.

FIG. 7 shows an embodiment of the instrument cluster 10, in which an eye point 46 of the driver 32 is identified and evaluated. The eye point can be sensed here by a sensor element 13 which is arranged in a region around the instrument cluster 10. The instrument cluster 10 is inclined by an angle α in order to protect against solar radiation. So that the driver 32 can continue to perceive the information on the deformable display 12 without obstruction, the instrument cluster is configured in order to distort the depiction of the information. The left enlarged cutout of the deformable display 12 shows such a distorted depiction. The information 28 is extended somewhat upward in length or distorted. As a result, the driver 32 perceives the information 28 in undistorted form in a depiction plane 48, as is shown in the right enlarged illustration.

If the position of the eye point 46 now changes with respect to the instrument cluster 10 because, for example, a larger or smaller driver 32 is sitting at the steering wheel 44, the angle 50 at which the driver views the deformable display 12 also changes, as indicated by the different alignment. The instrument cluster 10 is now configured in order to identify this change in the eye point 46, for example by using a camera system. If the instrument cluster 10 identifies a change, it is configured to adapt the distortion in such a manner that the driver 32 continues to perceive the depiction of the information 28 in undistorted form.

Figure 8:
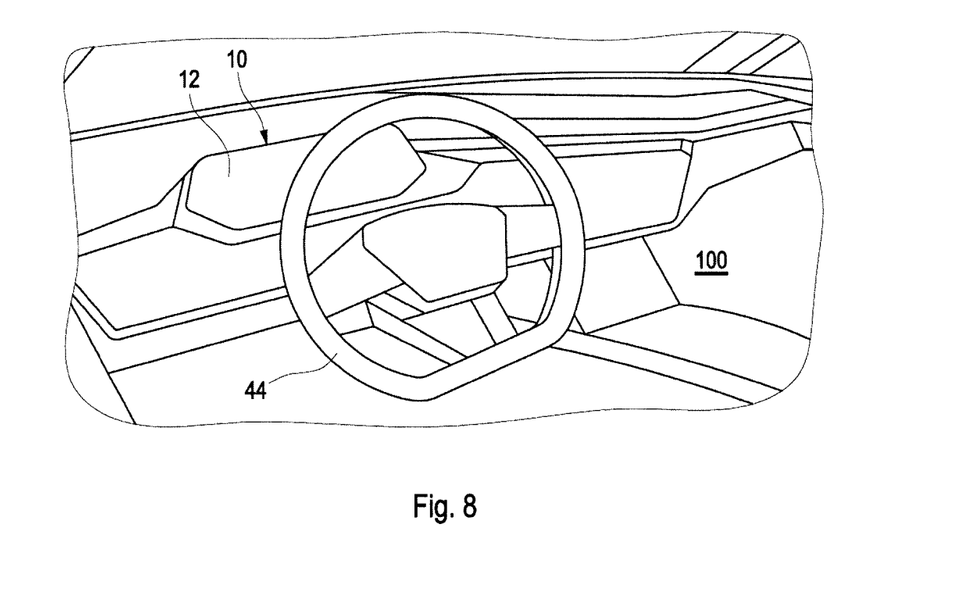
FIG. 8 is a perspective view of a vehicle interior with an embodiment of an instrument cluster according to the disclosure.

FIG. 8 shows a vehicle interior 100 of a vehicle with an instrument cluster 10. The vehicle interior 100 is free from a sun shading device for the deformable display 12.

Figure 9:
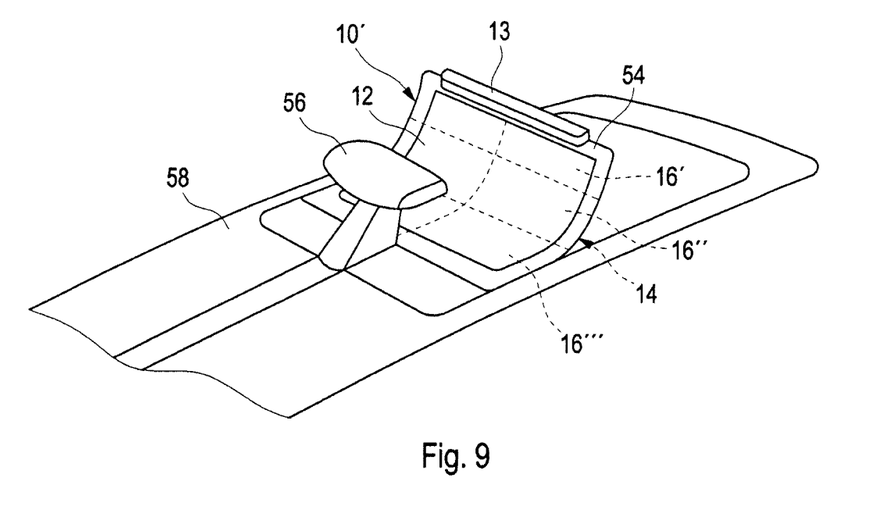
FIG. 9 is a perspective view of an embodiment of an operating display according to the disclosure.

FIG. 9 shows an embodiment of an operating display 10' with a deformable display 12 which is arranged in a center console 58. FIG. 9 therefore shows that the features of the instrument cluster 10 can also be used in different display devices in a vehicle. The center console 58 has a gear selection lever 56. In the shown embodiment of the operating display, the support elements 16', 16", 16'" are arranged one above another in layers. In the second position shown in FIG. 9, the support elements 16', 16", 16'" are displaced with respect to one another in such a manner that the deformable display 12 is readable. The support elements 16', 16", 16'" can be arranged next to one another here in the second position. The respective edges of the support elements 16', 16", 16'" can each overlap with an adjacent layer. In the first position, not shown, the support elements 16', 16", 16'" lie one above another in layers. The sensor element 13 is arranged at an upper end 54 of the operating display 10'.

FIG. 10 shows the related art of a previous instrument cluster in an instrument unit. The dominating sun visor for shielding the instrument cluster can clearly be seen.

In each example of the disclosure, the instrument cluster 10 may be free of an additional sun shading device, as a result of which the instrument panel can be designed to be lighter. This gives rise to an increased sensation of space and brings about visual modernity. Furthermore, a respective driving mode can be conveyed by the shape and/or the position of the instrument cluster. Such a design also constitutes a differentiation over the competition.

A description has been provided with reference to example embodiments, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An instrument cluster for displaying vehicle information, comprising:
    a support structure including support elements;
    a deformable display arranged on the support structure;
    at least one sensor configured to measure a light intensity with respect to light which is incident on the deformable display;
    at least one movement device configured to move the support structure from a first position to a second position based on a value corresponding to the light intensity measured by the at least one sensor, so that the light intensity with respect to light which is incident on the deformable display decreases to improve a readability of content displayed on the deformable display; and
    rails which are arc-shaped and along which the support elements move via the at least one movement device.

2. The instrument cluster as claimed in claim 1, wherein the support elements are movable independently of one another.

3. The instrument cluster as claimed in claim 1, wherein the support structure is movable from the first position to the second position based on a vehicle setting.

4. The instrument cluster as claimed in claim 1, wherein the deformable display is rotatable at least in sections about a first axis and/or about at least one second axis.

5. The instrument cluster as claimed in claim 4, wherein when the deformable display is rotatable at least in sections about the first axis and about the at least one second axis, the at least one second axis is arranged substantially parallel to the first axis.

6. The instrument cluster as claimed in claim 4, wherein when the deformable display is rotatable at least in sections about the first axis and about the at least one second axis, the second axis is arranged substantially transversely with respect to the first axis.

7. The instrument cluster as claimed in claim 1, wherein, in the first position, the deformable display is configured to be substantially planar.

8. The instrument cluster as claimed in claim 1, wherein, in at least one position of the support structure, at least one portion of the deformable display is inclined at an angle different from an angle of other portions of the deformable display.

9. The instrument cluster as claimed in claim 1, wherein the instrument cluster is configured to display the vehicle information on the deformable display at a constant angle for a user viewing the deformable display based on a position of the support structure.

10. The instrument cluster as claimed in claim 1, wherein the instrument cluster is configured to track an eye point of a user viewing the deformable display and to adapt the display of the vehicle information on the deformable display to a position of the eye point.

11. The instrument cluster as claimed in claim 1, wherein the deformable display is an organic light emitting diode display.

12. The instrument cluster as claimed in claim 1, wherein the movement element includes a lever.

13. The instrument cluster as claimed in claim 1, wherein
    the support elements are movable independently of one another, and
    the support elements are arranged one above another in layers which are displaceable with respect to one another.

14. A vehicle, comprising:
    a vehicle interior; and
    an instrument cluster provided in the vehicle interior, the instrument cluster including:
        a support structure,
        a deformable display arranged on the support structure,
        at least one sensor configured to measure a light intensity with respect to light which is incident on the deformable display,
        at least one movement device to move the support structure from a first position to a second position based on a value corresponding to the light intensity measured by the at least one sensor, so that the light intensity with respect to light which is incident on the deformable display decreases to improve a readability of content displayed on the deformable display, and
        rails which are arc-shaped and along which the support elements move via the at least one movement device. environmental influences sensed by the at least one sensor.

15. The vehicle as claimed in claim 14, wherein the at least one sensor is integrated in the deformable display or is provided in a region around the deformable display.

16. The vehicle as claimed in claim 15, wherein
    the deformable display includes a first portion and a second portion,
    the support elements include a first support element corresponding to the first portion, and a second support element corresponding to the second portion,
    when the value corresponding to the measured light intensity is less than a threshold value, the at least one movement device is configured to move at least one of the first support element and the second support element so that the support structure is moved from the first position to the second position and to thereby cause the first portion and the second portion to lie in a substantially same plane, and
    when the value corresponding to the measured light intensity is greater than a threshold value, the at least one movement device is configured to move at least one of the first support element and the second support element so that the support structure is moved from the second position to the first position and to thereby cause the first portion and the second portion to be displaced with respect to one another.

17. The vehicle as claimed in claim 14, wherein the at least one movement device is further configured to move the support structure according to a driving mode of the vehicle.

18. The vehicle as claimed in claim 17, wherein
    when the driving mode is a default driving mode, the at least one movement device is configured to move the support structure such that the deformable display is substantially planar, and when the driving mode is a sport driving mode, the at least one movement device is configured to move the support structure such that at least a portion of the deformable display is inclined with respect to a central portion of the deformable display, so as to shield the central portion from an external light source.

19. The vehicle as claimed in claim 18, wherein when the driving mode is the default driving mode the deformable display is configured to display more content than when the driving mode is the sport driving mode.

20. The vehicle as claimed in claim 14, wherein the deformable display includes a first portion and a second portion, the support elements include a first support element corresponding to the first portion, and a second support element corresponding to the second portion, and the at least one movement device is configured to move at least one of the first support element and the second support element so that the support structure is moved from the first position to the second position and to thereby cause the first portion and/or the second portion to be deformed, based on the value corresponding to the light intensity measured by the at least one sensor.

* * * * *

UNITED STATES PATENT AND TRADEMARK OFFICE
CERTIFICATE OF CORRECTION

PATENT NO. : 10,867,588 B2  
APPLICATION NO. : 16/479428  
DATED : December 15, 2020  
INVENTOR(S) : Jacques Hélot et al.

Page 1 of 1

It is certified that error appears in the above-identified patent and that said Letters Patent is hereby corrected as shown below:

In the Claims

Column 10, Line 5, In Claim 12, delete "element" and insert -- device --, therefor.

Column 10, Line 17 (approx.), In Claim 14, delete "structure," and insert -- structure including support elements, --, therefor.

Column 10, Lines 32-33, In Claim 14, delete "environmental influences sensed by the at least one sensor.".

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*